US011054039B2

(12) United States Patent
Feinstein et al.

(10) Patent No.: US 11,054,039 B2
(45) Date of Patent: Jul. 6, 2021

(54) SEAL RUNNER SUPPORT (71) Applicant: Rolls-Royce Corporation, Indianapolis, IN (US)

(72) Inventors: Daniel Feinstein, Zionsville, IN (US); Joseph Swift, Indianapolis, IN (US)

(73) Assignee: Rolls-Royce Corporation, Indianapolis, IN (US)

(\*) Notice: Subject to any disclaimer, the term of this patent is extended or adjusted under 35 U.S.C. 154(b) by 136 days.

(21) Appl. No.: 16/118,859

(22) Filed: Aug. 31, 2018

(65) Prior Publication Data

US 2020/0072358 A1 Mar. 5, 2020

(51) Int. Cl.
*F16J 15/54* (2006.01)
*F16C 35/08* (2006.01)
*F16C 33/76* (2006.01)

(52) U.S. Cl.
CPC ............... *F16J 15/54* (2013.01); *F16C 33/76* (2013.01); *F16C 35/08* (2013.01); *F16C 2360/23* (2013.01)

(58) Field of Classification Search
CPC ........ F16J 15/36; F16J 15/3288; F16J 15/441; F16J 15/348; F16J 15/004; F16J 15/3404; F16J 15/344; F16J 15/3448; F16J 15/3456; F16J 15/164; F16J 15/3292; F16J 15/3416; F16J 15/346; F16J 15/3496; F16J 15/38; F16J 15/44; F16J 15/442; F16J 15/445; F16J 15/54; F16J 15/3464; F16C 19/386; F16C 19/49; F16C 2361/63; F16C 33/24; F16C 33/78; F16C 33/76
See application file for complete search history.

(56) References Cited

U.S. PATENT DOCUMENTS

| | | | |
|---|---|---|---|
| 2,937,039 A | 5/1960 | Santapa | |
| 3,559,725 A * | 2/1971 | Fucinari | F28D 19/047 |
| | | | 165/7 |
| 3,632,117 A | 1/1972 | Villasor | |
| 3,948,533 A | 4/1976 | Novosad | |
| 4,036,505 A | 7/1977 | Floyd et al. | |
| 4,174,844 A | 11/1979 | Zobens | |
| 4,361,334 A | 11/1982 | Amorese et al. | |
| 4,538,820 A | 9/1985 | Duffee | |

(Continued)

FOREIGN PATENT DOCUMENTS

| DE | 20217983 U1 | 2/2003 |
|---|---|---|
| EP | 775859 A1 | 5/1997 |

(Continued)

*Primary Examiner* — Eugene G Byrd
(74) *Attorney, Agent, or Firm* — Barnes & Thornburg LLP (57) ABSTRACT

A machine can include a radially inner component, a radially outer component, and a circumferential seal assembly between the inner and outer components. At least one (e.g., both) of the inner and outer components can be a rotor. The circumferential seal assembly can include a circumferential metallic mount, a circumferential ceramic runner, a circumferential carbon seal, and one or more spring energized seals. The spring energized seals can prevent rotational slippage between the metallic mount and the ceramic runner. The spring energized seals can be necessary to prevent rotational slippage between the metallic mount and the ceramic runner for at least one standard operating state of the machine.

8 Claims, 6 Drawing Sheets

(56) References Cited

U.S. PATENT DOCUMENTS

| | | | |
|---|---|---|---|
| 4,744,721 A * | 5/1988 | Villeneuve | F04D 29/128 277/350 |
| 5,014,999 A * | 5/1991 | Makhobey | F01D 11/003 277/422 |
| 5,017,022 A | 5/1991 | Ruggles et al. | |
| 5,039,113 A * | 8/1991 | Gardner | F16J 15/3412 277/348 |
| 5,183,270 A | 2/1993 | Alten et al. | |
| 5,344,161 A * | 9/1994 | Sandgren | F16C 35/077 267/1.5 |
| 5,421,593 A | 6/1995 | Aritsubo et al. | |
| 5,533,739 A * | 7/1996 | Sedy | F16J 15/3472 277/390 |
| 5,626,347 A * | 5/1997 | Ullah | F01D 11/003 277/399 |
| 6,132,168 A * | 10/2000 | Kovaleski | F01D 11/001 415/107 |
| 6,142,476 A | 11/2000 | Iwane | |
| 6,224,322 B1 * | 5/2001 | Calboreanu | F04D 29/126 277/423 |
| 6,234,489 B1 | 5/2001 | Orlowski et al. | |
| 6,322,081 B1 * | 11/2001 | Ullah | F16C 33/76 277/504 |
| 6,655,695 B1 | 12/2003 | Sund et al. | |
| 6,666,460 B2 * | 12/2003 | Diana | F01D 11/005 277/608 |
| 6,918,594 B2 | 7/2005 | Sund et al. | |
| 7,549,836 B2 * | 6/2009 | Anderson | F01D 25/16 277/500 |
| 7,798,769 B2 | 6/2010 | Keller | |
| 8,201,830 B2 | 6/2012 | Nobrega | |
| 8,657,297 B2 | 2/2014 | Garrison | |
| 8,662,756 B2 | 3/2014 | Care | |
| 8,858,087 B2 | 10/2014 | Gibbons | |
| 9,359,912 B2 * | 6/2016 | Ullah | F01D 11/003 |
| 9,869,391 B2 | 1/2018 | Litis et al. | |
| 2002/0140177 A1 * | 10/2002 | Murray | F16J 15/324 277/500 |
| 2003/0015842 A1 * | 1/2003 | Wilhelm | F04D 29/143 277/390 |
| 2007/0194536 A1 | 8/2007 | Nobrega | |
| 2007/0262532 A1 * | 11/2007 | Ohama | F16J 15/3404 277/390 |
| 2008/0050261 A1 | 2/2008 | Roddis | |
| 2009/0045587 A1 * | 2/2009 | DeAngelis | F01L 1/3442 277/500 |
| 2009/0134584 A1 | 5/2009 | Lederer et al. | |
| 2009/0142180 A1 * | 6/2009 | Munson | F01D 11/001 415/111 |
| 2009/0152818 A1 | 6/2009 | Droscher et al. | |
| 2011/0123329 A1 | 5/2011 | Takeuchi et al. | |
| 2011/0175297 A1 | 7/2011 | Fesl et al. | |
| 2012/0133099 A1 | 5/2012 | Fesl | |
| 2012/0177486 A1 | 7/2012 | Ullah et al. | |
| 2013/0285331 A1 | 10/2013 | Kostka et al. | |
| 2014/0265145 A1 | 9/2014 | Copeland, III et al. | |
| 2014/0265151 A1 * | 9/2014 | Vasagar | F01D 11/003 277/500 |
| 2015/0115539 A1 | 4/2015 | Guenther et al. | |
| 2015/0240951 A1 | 8/2015 | Kirchner | |
| 2017/0044920 A1 | 2/2017 | Vetters | |
| 2017/0082065 A1 | 3/2017 | Swift | |
| 2017/0234430 A1 | 8/2017 | Fadgen | |
| 2018/0010525 A1 | 1/2018 | Madge | |

FOREIGN PATENT DOCUMENTS

| | | | |
|---|---|---|---|
| EP | 2474711 A2 | 7/2012 | |
| JP | 10151333 A * | 6/1998 | F16J 15/3464 |

* cited by examiner

SEAL RUNNER SUPPORT

BACKGROUND

Field of the Disclosure

Among other things, the present disclosure relates to seal runners for circumferential seals.

Description of Related Art

Energy conversion devices (e.g., electrical generators, engines) often incorporate rotating shafts for mechanical power transmission. Rotating shafts can be supported by inner structure (e.g., a rod extending through a hollow rotating shaft) or outer structure (e.g., a collar surrounding a circumference of a rotating shaft). Support structure can be static or rotating.

Bearing assemblies are often disposed between a rotating shaft and support structure. A bearing assembly can include roller bearings contacting both the rotating shaft and the support structure. The bearing assembly can prevent the rotating shaft from colliding with the support structure. Examples of bearing assemblies appear in U.S. Pub. No. 2018/0010525 to Madge, U.S. Pat. No. 8,662,756 to Care, and U.S. Pub. No. 2017/0082065 to Swift.

Although roller bearings are smooth, at least some frictional contact can occur between (a) the rotational component and a bearing assembly, and/or (b) the bearing assembly and the support structure. During operation, the frictional contact generates heat. To dissipate heat, a bearing assembly is often immersed in a fluid, such as oil. The fluid can circulate within a loop such that fluid is cooled after absorbing heat from the bearing assembly. To maintain the integrity of the fluid loop, one or more seals may need to be disposed between the support structure and the rotating shaft.

SUMMARY

A machine can include a radially inner component, a radially outer component, and a circumferential seal assembly between the inner and outer components. At least one (i.e., only one or both) of the inner and outer components can be a rotor. The circumferential seal assembly can include: a circumferential metallic mount, a circumferential ceramic runner, a circumferential carbon seal, and one or more spring energized seals.

The circumferential metallic mount can be secured to the inner component. The circumferential ceramic runner can be disposed radially outward of the mount. The circumferential carbon seal disposed in (i.e., at least partially disposed in) a housing. The housing can be secured to the second component. The carbon seal and the runner can be configured to define an outer interface therebetween. The outer interface can separate a first fluid disposed in the machine from a second fluid disposed in the machine. The one or more spring energized seals can each include a spring disposed within a sleeve. The one or more spring energized seals can each simultaneously contact the runner and the mount.

In a machine, a method of sealing a gap defined between a first component and a second component with a circumferential seal assembly can include: securing a circumferential metallic mount to the first component; disposing a circumferential ceramic runner radially outward of the mount; affixing a circumferential carbon seal disposed in a housing to the second component to define an outer interface between the carbon seal and the runner, the outer interface being for separating a first fluid from a second different fluid; disposing one or more spring energized seals in simultaneous contact with the runner and the mount, each of the one or more spring energized seals including an inner spring within an outer sleeve. At least one of the first and second components (e.g., both) can be rotors. The rotors can be in a counter-rotational relationship.

In a machine including a rotor, a stator, and a circumferential seal assembly disposed therebetween, a method can include: operating the machine in a startup condition where a ceramic runner rotationally slips with respect to a metallic mount; operating the machine in a steady state condition where the metallic mount expands into firm contact with the mount.

In both the startup condition and the steady state condition: one or more springs can be compressed between the ceramic runner and the metallic mount; and/or the ceramic runner can interface with a carbon seal secured to the stator to separate a first fluid from a different second fluid.

BRIEF DESCRIPTION OF DRAWINGS

The above summary and the below detailed description of illustrative embodiments may be read in conjunction with the appended Figures. The Figures show some of the illustrative embodiments discussed herein. As further explained below, the claims are not limited to the illustrative embodiments. For clarity and ease of reading, some Figures omit views of certain features. The relative dimensions in the Figures can be relied upon as original written support. But the claimed inventions are not limited to any depicted relative dimensions unless expressly stated otherwise.

Various Figures use "L" for the longitudinal dimension (also called the axial dimension), "R" for the radial dimension, and "C" for the circumferential dimension. The claimed inventions are not limited to the depicted longitudinal, radial, and circumferential orientations.

DETAILED DESCRIPTION

Illustrative (i.e., example) embodiments are disclosed. The claims are not limited to the illustrative embodiments. Therefore, some implementations of the claims will have different features than in the illustrative embodiments. Changes to the claimed inventions can be made without departing from their spirit. The claims are intended to cover implementations with such changes.

At times, the present application uses directional terms (e.g., front, back, top, bottom, left, right, etc.) to give the reader context when viewing the Figures. Directional terms do not limit the claims. Any directional term can be replaced with a numbered term (e.g., left can be replaced with first, right can be replaced with second, and so on). Furthermore, any absolute term (e.g., high, low, etc.) can be replaced with a corresponding relative term (e.g., higher, lower, etc.).

Figure 1:
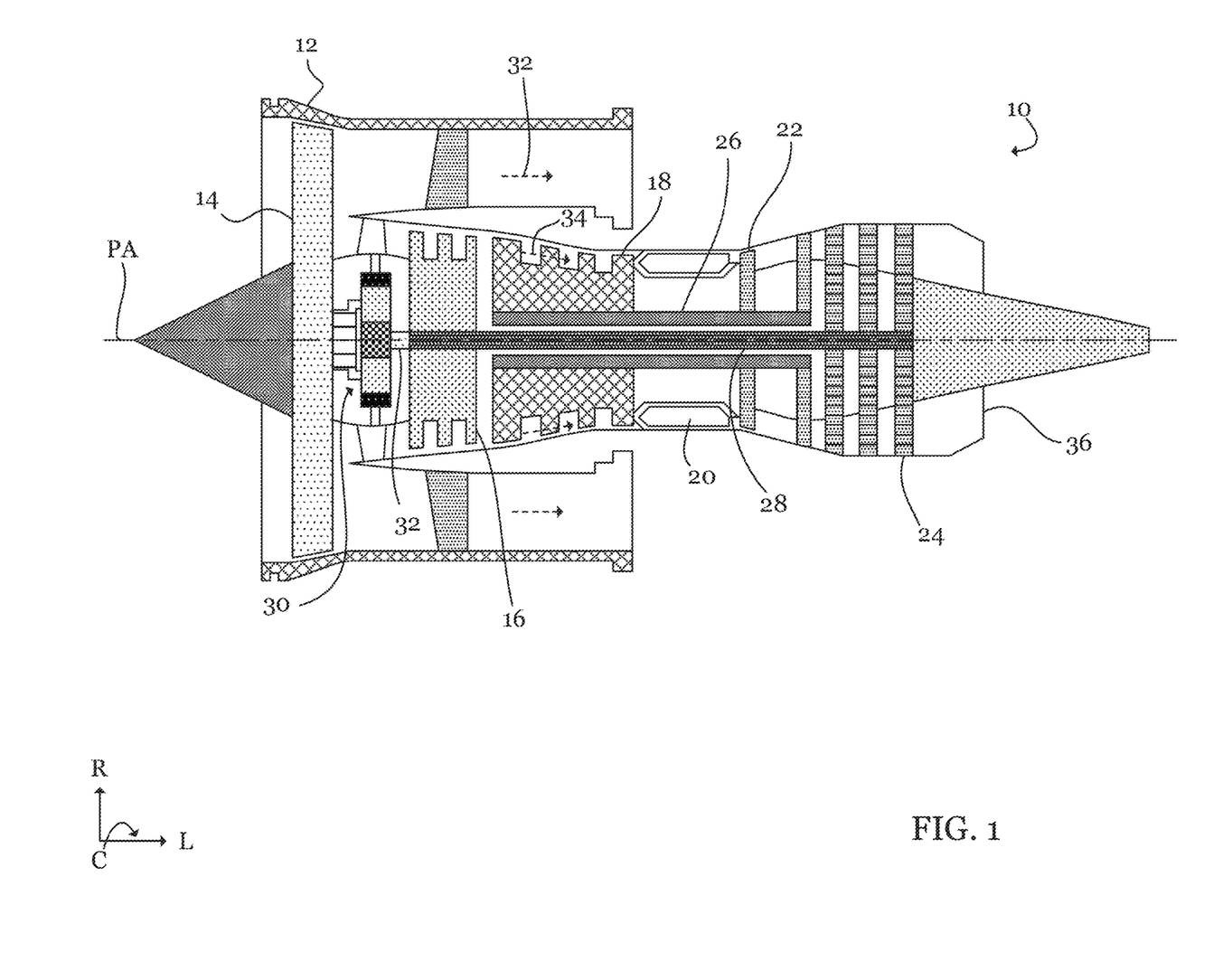
FIG. 1 is a cross-sectional schematic of an exemplary gas turbine engine.

Referring to FIG. 1, gas turbine engine 10 can include a fan casing 12 in which a fan 14 is disposed. Fan 14 can draw air into gas turbine engine 10. Air drawn into gas turbine engine 10 can separate between a bypass flow path 32 through fan casing 12 and a core flow path 34 through compressors 16, 18, combustor 20, and turbines 22, 24.

Combustor 20 can inject fuel into core air flow 34. Combustor 20 can ignite the fuel/air mixture to produce high pressure combustion products. The high-pressure combustion products can flow past high speed turbine 22, causing high speed turbine 22 to spin. The lower pressure combustion products exhausted from high speed turbine 22 can flow past low speed turbine 24, causing low speed turbine 24 to spin. Combustion products can leave gas turbine engine 10 via exhaust nozzle 36.

High speed turbine 22 and high speed compressor 18 can be mounted to opposing ends of high speed shaft 26. Low speed turbine 24 and low speed compressor 16 can be mounted to opposing ends of low speed shaft 28. Therefore, high speed turbine 22 can drive high speed shaft 26 along with high speed compressor 18. Similarly, low speed turbine 24 can drive low speed shaft 28 along with low speed compressor 16.

Figure 2:
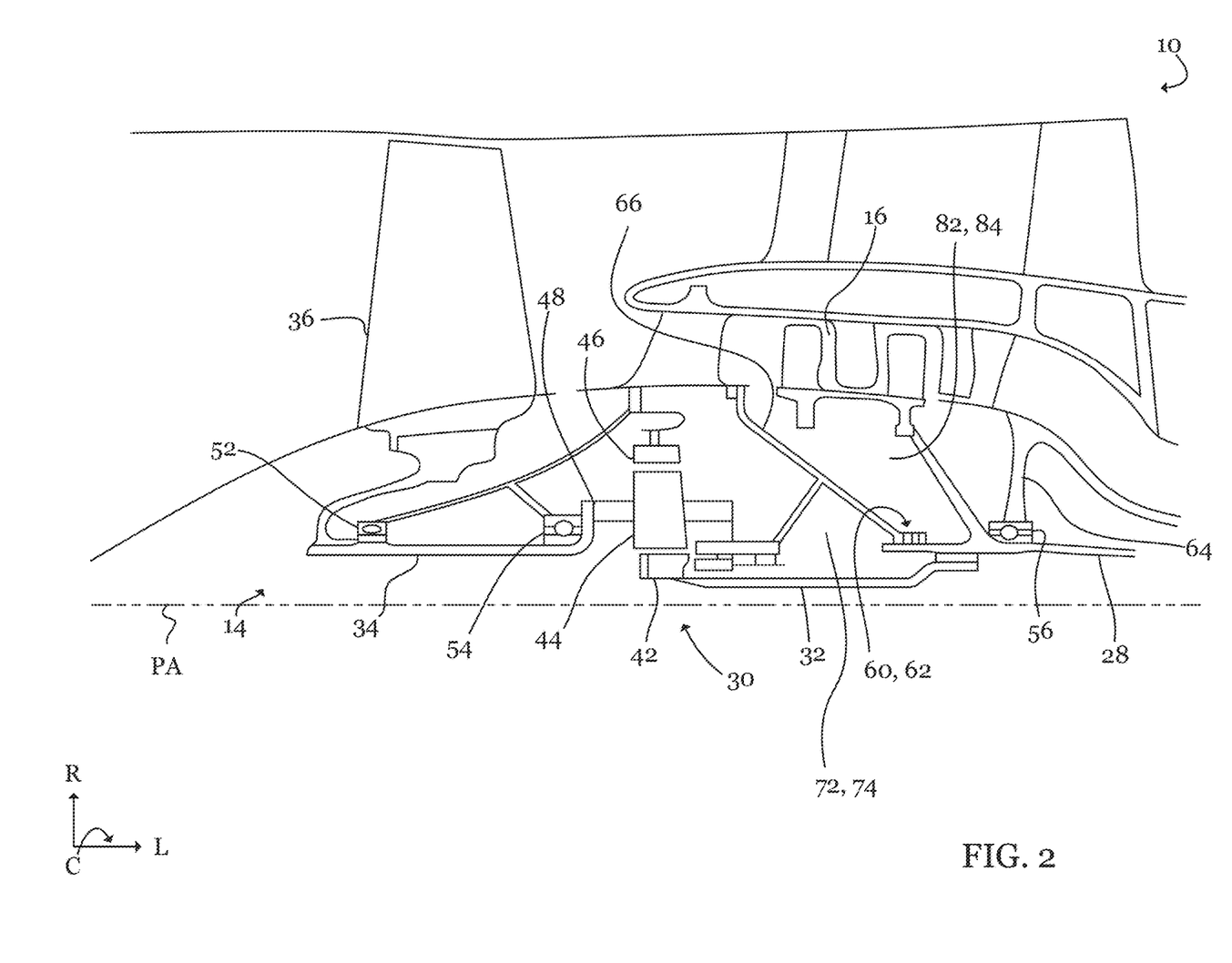
FIG. 2 is a cross-sectional schematic of the exemplary gas turbine engine.

According to some embodiments (not shown), fan 14 is directly mounted to low speed shaft 28 such that torque delivered by low speed turbine 24 drives both fan 14 and low speed compressor 16 at a common speed. According to other embodiments, and as shown in FIGS. 1 and 2, a gearbox 30 is disposed intermediate fan 14 and low speed shaft 28. Gearbox 30 can perform a speed reduction function, enabling fan 14 to rotate at a lesser speed than low speed compressor 16, which can improve the fuel efficiency of gas turbine engine 10. Fan 14, gearbox 30, low speed compressor 16, high speed compressor 18, low speed turbine 22, high speed turbine 24, low speed shaft 28, and high speed shaft 26 can be rotatable about engine principle axis PA.

Referring to FIG. 2, gearbox 30 can receive rotational energy from low speed shaft 28 via an input coupling 32 and transmit rotational energy to fan 14 via fan shaft 34. Gearbox 30 can include an epicyclical gear system, such as a star gear system or a planet gear system. As shown, gearbox includes a planet gear system including a sun gear 42 meshed with a plurality of planet gears 44, which are each meshed with a ring gear 46. A carrier 48 can include a plurality of posts (not labeled). Each post can extend through a central aperture (not labeled) of one planet gear 44.

During operation, low speed spool 28 can rotationally drive sun gear 42. By virtue of being meshed between sun gear 42 and ring gear 46, planet gears 44 can orbit about sun gear 42 and each planet gear 44 can rotate about its central axis. Since carrier posts (not labeled) extend through planet gears 44, the orbital motion of planet gears 44 can cause carrier 48 to rotate about its central axis. Carrier 48 can be splined to fan shaft 34, from which fan blades 36 can radially extend.

Although not shown, a star gear system can share the same basic components as the planetary gear system of FIG. 2. Therefore, the operation of a star gear system can be explained with reference to the element numbers in FIG. 2. In a star gear system, each planet gear 44 (i.e., star gear) can be rotate in-place about a carrier post 48. Carrier 48 can be static. Ring gear 46 can be rotatable. During operation, rotation of sun gear 42 can cause each star gear 44 to rotate about a respective static carrier post 48. The rotation of star gears 44 can drive ring gear 46, which can be splined to fan shaft 34.

Referring to FIG. 2, first and second bearing assemblies 52, 54 can radially support fan shaft 34. Third bearing assembly 56 can radially support low speed shaft 28. Gas turbine engine 10 can include many other bearing assemblies for radially supporting low speed shaft 28 at other locations and for radially supporting high speed shaft 26.

A first seal assembly 60, 62 can form a circumferential seal between low speed shaft 28 and third core static support structure 66 to separate a first fluid 72 (e.g., air) disposed in first region 74 (also called a chamber or sump) from a second fluid 82 (e.g., oil) disposed in a second region 84 (also called a chamber or sump). Second fluid 82 can lubricate and cool third bearing assembly 56.

Circumferential seal 62 can prevent second fluid 82 (e.g., oil) from leaking into first region 74 and/or prevent first fluid 72 (e.g., air) from leaking into second region 84. According to some embodiments, first fluid 72 can be lubricant (e.g., oil) for gearbox 30 and second fluid 82 can be air. Although not shown, a plurality of additional circumferential seal assemblies 60 can be disposed in gas turbine engine 10. For example, a circumferential seal assembly 60 (not shown) can define a lubricant sump for first and second bearing assemblies 52, 54. A gas turbine engine 10 is only one example of machinery in which a circumferential seal assembly 60 can be applied. According to various embodiments, circumferential seal assembly 60 can be disposed in an electric generator, a motor, etc.

Figure 3:
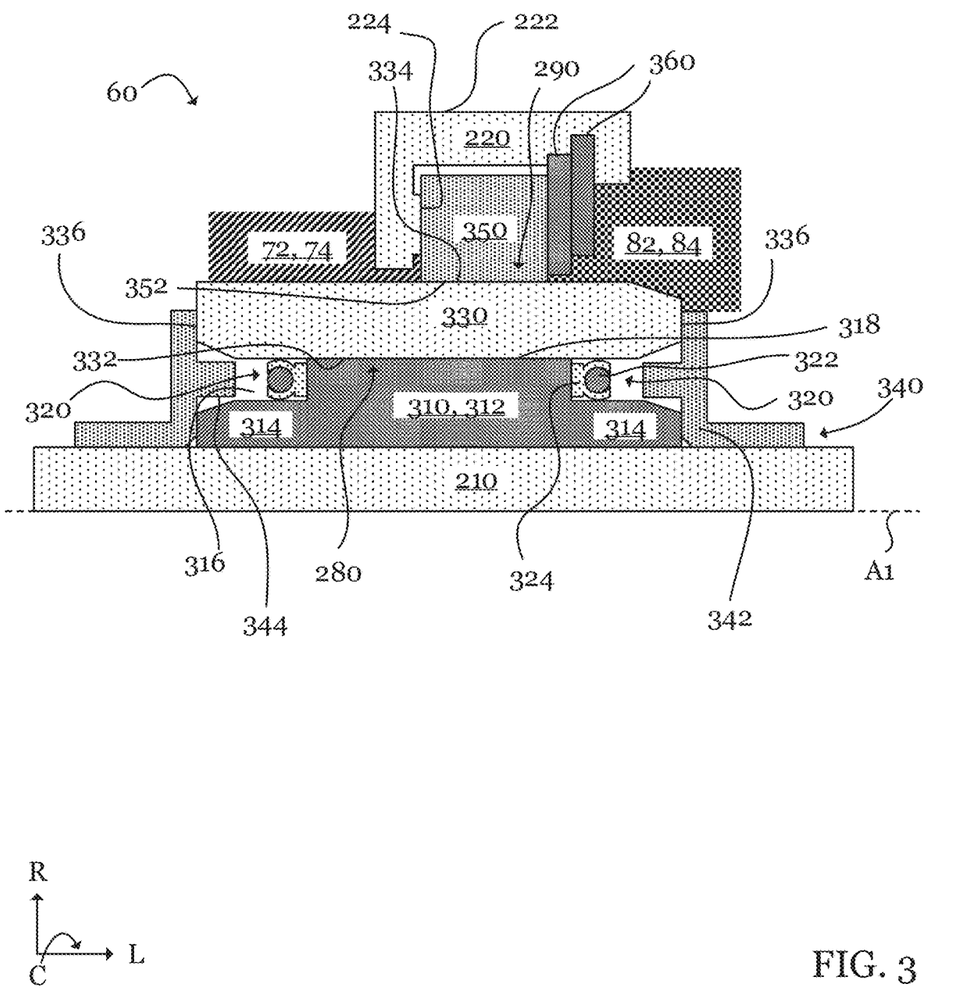
FIG. 3 is a cross-sectional schematic of an exemplary seal assembly, which can appear in the exemplary gas turbine engine.

FIG. 3 shows an exemplary circumferential seal assembly 60 between a first component 210 and a second component 220. FIG. 3 only shows an upper cross-section of seal assembly 60, first component 210, and second component 220. A lower cross-section can be a mirror image thereof across axis A1.

First component 210 is generally referred to as a rotor (e.g., a shaft) and second component 220 is generally referred to as a stator (e.g., static support structure). However, according to some embodiments, first component 210 can be a stator and second component 220 can be a rotor. According to other embodiments, both first and second components 210, 220 can be rotors spinning at the same or different speeds.

Circumferential seal assembly 60 can be first circumferential seal assembly 62 of FIG. 2 where rotor 210 is low speed shaft 28 and stator 220 is static engine support structure. Circumferential seal assembly 60 can be for separating first fluid 72 (e.g., air) in first compartment 74 from second fluid 82 (e.g., oil) in second compartment 84.

Circumferential seal assembly 60 can include a mount 310, one or more springs 320 (two are shown), a runner 330, one or more longitudinal retainers 340, a ring 350, and retainers 360. Mount 310, springs 320, runner 330, and retainers 340 can be affixed to rotor 210 for rotation therewith. Ring 350 can be affixed to stator 220. Ring 350 can be lightly attached to stator 220 such that ring 350 can rotate with respect to stator 220 while being kept in a desired longitudinal position by retainers 340. According to various embodiments, components 210 and 220 are in a rotational relationship (i.e., both are rotors), which rotate in the same or opposite directions. Therefore, ring 350 can counter-rotate with respect to runner 330.

When in firm contact with each other, runner 330 and ring 350 can rotate at the same speed. All components depicted in FIG. 3 can circumferentially extend about axis A1.

According to some embodiments, runner 330 and ring 350 are in a counter-rotational relationship.

During operation, runner 330 can spin with rotor 210 about axis A1. Runner 330 can slip with respect to rotor 210 and thus rotate at a different speed than rotor 210. Runner outer surface 334 and ring inner surface 352 can define a circumferential interface 290 therebetween. Interface 290 can be defined by direct contact between runner outer surface 334 and ring inner surface 352. Interface 290 can be defined by a circumferential gap with a minor radial thickness between runner outer surface 334 and ring inner surface 352. In such a case, a small amount of fluid can leak between first and second fluid chambers (also called compartments) 74, 84.

Mount 310 can include and/or consist of a mount material, which can include and/or consist of metal (e.g., a super alloy such as inconel). Mount 310 can be directly affixed to rotor 210. Mount 310 can include a central body 312 from which opposing shoulders 314 longitudinally extend to define a pair of circumferential pockets 316 in which springs 320 can be disposed.

Mount 310 can include an outer surface 318 for frictionally interfacing with runner inner surface 332. Outer surface 318 can be smooth (e.g., polished) and configured to be in complete circumferential contact with runner inner surface 332 between springs 320. Mount 310 can be press-fit (i.e., interference fit) onto rotor 210. Mount 310 can be thermally fitted onto rotor 210. For example, mount 310 can be heated into an expanded state, then slipped over rotor 210. Upon cooling, mount 310 can be in a tight compressive fit against rotor 210.

Springs 320 (also called seals, compressive supports, and flexible supports) can be spring-energized seals including a circumferentially energized inner spring 322 confined within a flexible housing 324 (also called a sleeve). Inner spring 322 can be radially inwardly and/or radially outwardly biased to push sleeve 324 into compressive sealing contact with mount shoulder 314 and/or runner inner surface 332. Therefore springs can provide both a biasing and a sealing function. Springs 320 can be C-seals, W-seals, O-rings, jacketed seals, etc.

Springs 320 can fluidly seal the interface 280 (also called the inner interface) between mount 310 and runner 330. As further discussed below, compression from springs 320 can bias runner 330 radially outward toward ring 350. Sleeves 324 can be directly secured (e.g., thermally bonded) to mount 310. Alternatively, springs 320 can remain in position by virtue of being in frictional engagement with mount 310 and runner 330.

Runner 330 can be a ring including and/or consisting of a runner material. The runner material can be harder than the ring material (discussed below). The runner material can include and/or consist of ceramic, silicon carbine, tungsten carbide, etc. Runner 330 can have a lesser coefficient of thermal expansion than mount 310. Runner 330 can be press-fit (i.e., interference fit) against mount 310. Runner 330 can be thermally fitted against mount 310. For example, mount 310 can be chilled, then slipped within runner 330.

Runner 330 can be transitionally fit with respect to mount 310. For example, when assembly 60 is in a cold state, runner 330 can be in a non-interference fit with mount 310 and when runner 60 is in a hot state, runner 330 can be in an interference fit with mount 310.

Runner 330 can include inner surface (i.e., face) 332 for interfacing with mount 310 and for partially defining circumferential pockets 316. Runner inner surface 322 can be sized for complete circumferential contact with mount outer surface 318 between springs 320. Runner 330 can include outer surface 334 for defining circumferential interface 290 (also called the outer interface) with ring 350. Runner 330 can include longitudinal end surfaces 336 for interfacing with retainers 340.

Retainers 340 can be affixed to rotor 210. Retainers 340 can define (i.e., at least partially define) circumferential pockets 316. Retainers 340 can include one or more springs (not shown) for longitudinally centering runner 330 on mount 310. Retainers 340 can be flexible and biased to the "L" shaped state shown in FIG. 3. Runner 330 can be sized to press against both retainers 340 when longitudinally centered.

Retainers 340 can include an L-shaped body 342 and a circumferential protrusion 344. Protrusions 344 can extend into pockets 316. Although not shown, protrusions 344 can be sized to directly contact springs 320 (e.g., by extending the longitudinal dimension of each protrusion 344).

Ring 350 can include and/or consist of a ring material, which can include and/or consist of carbon. The ring material, such as carbon, can have a lesser hardness (i.e., be softer than) the runner material. Ring 350 can include ring inner surface 352 for defining interface 290 with runner outer surface 334. Interface 290 can be direct physical contact between ring inner surface 352 and runner outer surface 334. Interface 290 can be a small gap (through which some fluid may leak) between surfaces 352, 334.

Stator 220 can include a seal housing 222. Seal housing 222 can protect and hold ring 350 and retainers 360. As shown, retainers 360 can include one or more retaining rings, which can bias sealing ring 350 into firm engagement with a longitudinally protruding ring 224 extending from seal housing 222.

As stated above, runner 330 can be secured to mount 310 via an interference fit. Runner 330, however, can be a brittle material such as ceramic. Applying an interference fit to a brittle material can lead to fracturing (i.e., failure). According to some embodiments, runner 330 is not interference fit with mount 310.

Figure 4:
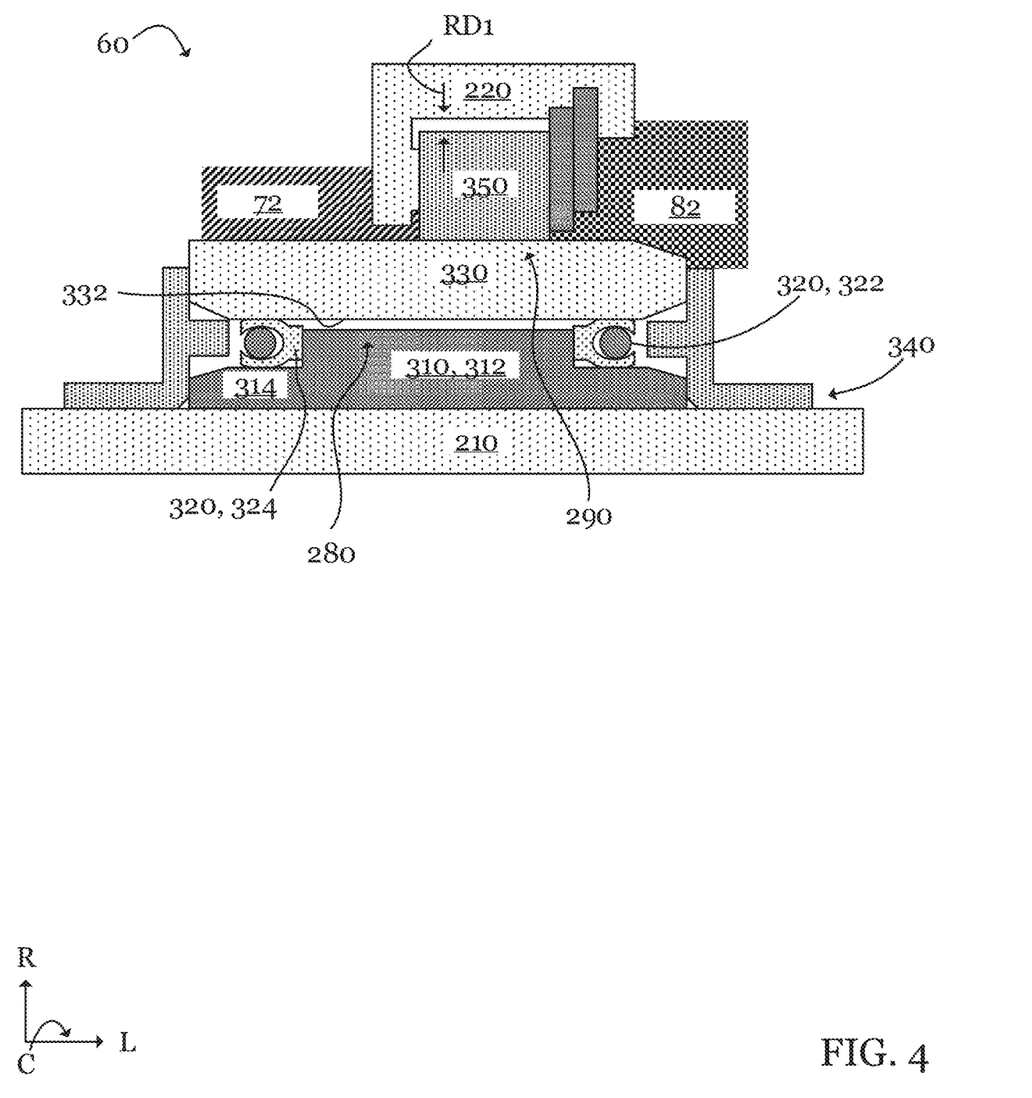
FIG. 4 is a cross-sectional schematic of the exemplary seal assembly in an exemplary cold state.
Figure 5:
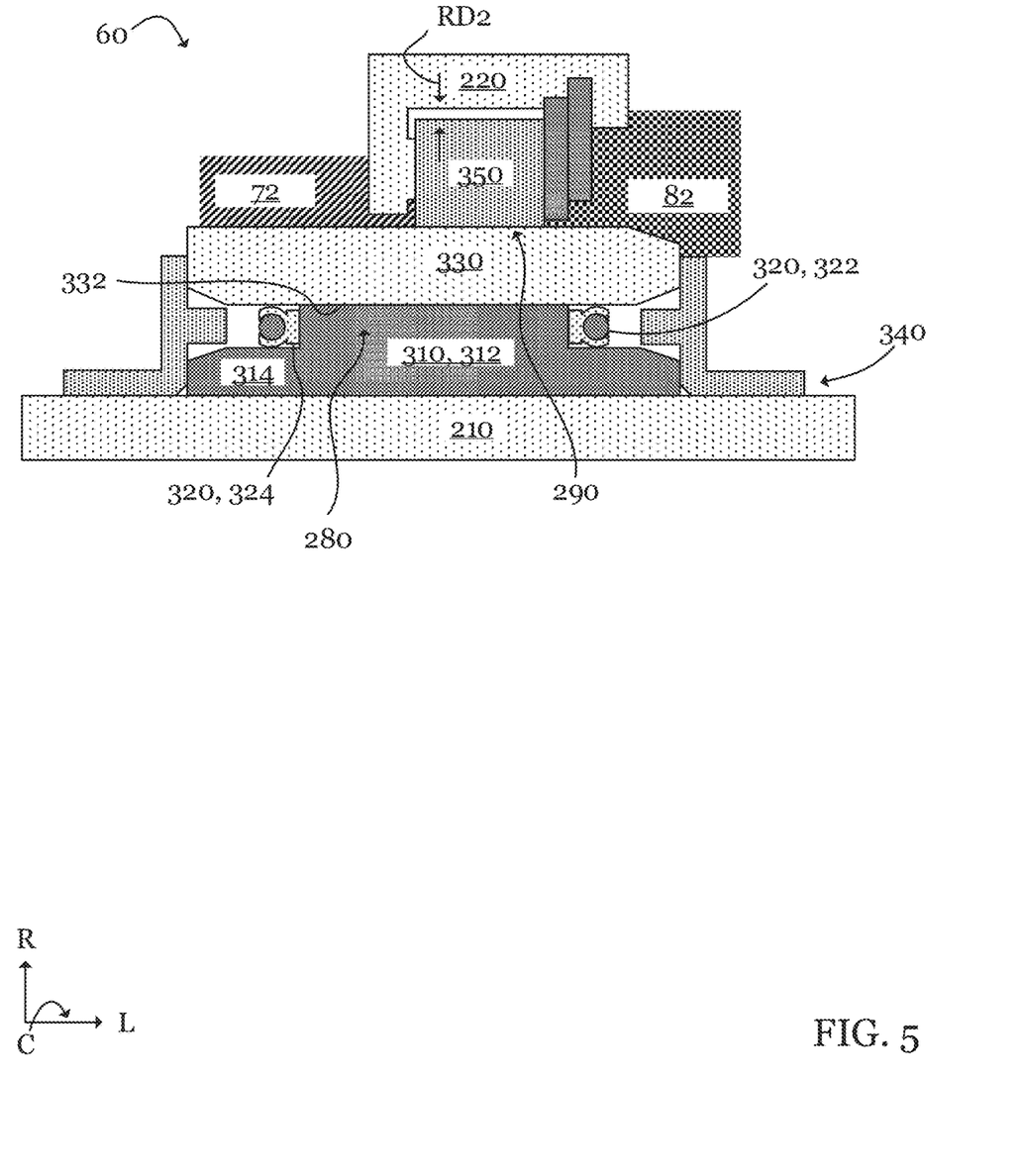
FIG. 5 is a cross-sectional schematic of the exemplary seal assembly in an exemplary intermediate state.
Figure 6:
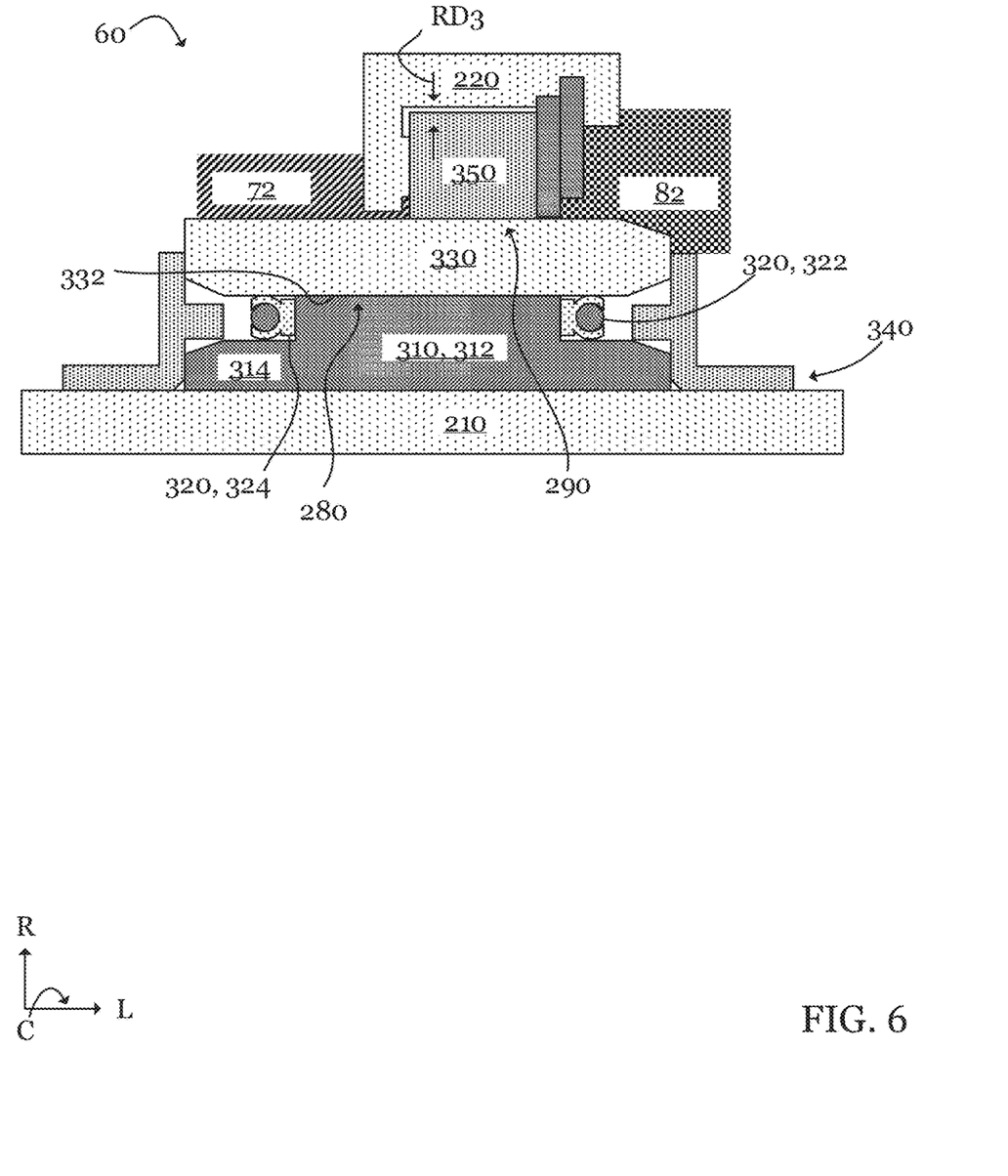
FIG. 6 is a cross-sectional schematic of the exemplary seal assembly in an exemplary hot state.

FIG. 4 shows an embodiment of assembly 60 in an exemplary cold state (also called a first state or a contracted state), which can occur after the machine in which assembly 60 is disposed has been deactivated for a span of time. A cold state can be defined to occur, for example, when assembly 60 is less than a cold state temperature, such as 80, 90, 100, 130, 150, 200, 250, or 300° F. FIG. 5 shows the embodiment of assembly 60 in an exemplary intermediate state, which can occur when assembly 60 has a temperature between the cold state temperature and a hot state temperature. FIG. 6 shows the embodiment of assembly 60 in an exemplary hot state, which can occur when assembly 60 has a temperature above the hot state temperature. The hot state temperature can be, for example, 350, 400, 450, 500, 600, 700, 800, or 1000° F.

Referring to the exemplary cold state shown in FIG. 4, mount 310 can be in contracted state where mount outer surface 318 is radially displaced from runner inner surface 332 such that inner interface 280 is a ring shaped radial gap. Springs 320 can push runner 330 into ring 350 such that outer interface 290 is defined by direct contact between runner 330 and ring 350. A first outer radial distance RD1 can be defined between stator inner surface 224 and ring outer surface 354. Although not labeled, a first inner radial distance can be defined by the radial thickness of inner interface 332. The cold state can occur during startup of the machine.

As rotor 210 spins, friction between (a) spring sleeves 324 and runner 330 and (b) spring sleeves 324 and mount 310 can discourage rotational slipping between runner 330 and mount 310. Springs 320 can apply a first spring frictional torque against runner 330. At least some rotational slipping can occur between (a) springs 320 and mount 310, (b) springs 320 and runner 330, and (c) mount 310 and runner 330.

According to some embodiments (not shown), an anti-rotation feature is provided between mount 310 and each longitudinal retainer 340. For example, a plurality of longitudinally extending pins (not shown) can extend from each L-shaped body 342 into longitudinally extending blind bores (not shown) defined in each mount shoulder 314. The anti-rotation feature can therefore prevent relative rotation between retainers 340 and mount 310. Alternatively, or in addition, the anti-rotation feature can be provided by simultaneously compressing mount 310 between the opposing retainers 340.

According to some embodiments (not shown), an anti-rotation feature is provided between runner 330 and each longitudinal retainer 340. For example, a plurality of longitudinally extending pins (not shown) can extend from each L-shaped body 342 into longitudinally extending blind bores (not shown) defined in each longitudinal side of runner 330. The anti-rotation feature can therefore prevent relative rotation (i.e., rotational slipping) between runner 330 and retainers 340 when mount 310 is not in interfering contact with runner 330 and the frictional braking torque applied by springs 320 is insufficient to otherwise prevent relative rotation. Alternatively, or in addition, the anti-rotation feature can be provided by simultaneously compressing runner 330 between the opposing retainers 340.

According to some embodiments, there is light contact between runner inner surface 332 and mount outer surface 318 during the cold state. Therefore, mount 310 can apply a first mount frictional torque against runner 330. The first spring frictional torque can be greater than the first mount frictional torque. The first mount frictional torque can be zero. The first mount frictional torque can be less than 10, 20, 30, 40, 50, 70, or 90% of the first spring frictional torque.

Referring to the exemplary intermediate state (also called second state) shown in FIG. 5, mount 310 can have thermally expanded from the cold state of FIG. 4. Mount 310 can now be in light contact with runner 330 (if there was no contact between mount 310 and runner 330 in the cold state) or in medium contact with runner 330 (if there was light contact between mount 310 and runner 330 in the cold state). Springs 320 can push runner 330 into ring 350 such that outer interface 290 is defined by direct contact between runner 330 and ring 350. A second outer radial distance RD2 can be defined between stator inner surface 224 and ring outer surface 354. The second radial distance can be smaller than the first radial distance. A second inner radial distance (not labeled) can be defined by the radial thickness of inner interface 332. The second inner radial distance can be greater than zero but smaller than the first radial distance.

As rotor 210 spins, friction between (a) spring sleeves 324 and runner 330 and (b) spring sleeves 324 and mount 310 can discourage rotational slipping between runner 330 and mount 310. Springs 320 can apply a second spring frictional torque against runner 330. Mount 310 can apply a second mount frictional torque against runner 330 (by virtue of the contact at inner interface 280).

The second spring frictional torque can be greater than the first spring frictional torque. The second mount frictional torque can be greater than the first mount frictional torque. The second mount frictional torque can be greater than or equal to the second spring frictional torque.

At least some rotational slipping can occur between (a) springs 320 and mount 310, (b) springs 320 and runner 330, and (c) mount 310 and runner 330. Alternatively, the intermediate state can be defined to occur when the increased frictional torque stops (i.e., substantially prevents) rotational slipping between mount 310, springs 320, and runner 330.

Referring to the hot state (also called third state or expanded state) shown in FIG. 6, mount 310 has experienced additional thermal expansion over the intermediate state. Mount 310 can now be in medium contact (e.g., firm contact) with runner 330 (if there was no contact between mount 310 and runner 330 in the cold state) or in tight contact (e.g., interfering contact) with runner 330 (if there was light contact between mount 310 and runner 330 in the cold state).

Springs 320 can push runner 330 into ring 350 such that outer interface 290 is defined by direct contact between runner 330 and ring 350. A third outer radial distance RD3 can be defined between stator inner surface 224 and ring outer surface 354. The third radial distance can be smaller than the second radial distance. A third inner radial distance (not labeled) can be defined by the radial thickness of inner interface 332. The third inner radial distance can be smaller than the second radial distance. The third inner radial distance can be zero. The third inner radial distance can be negative (corresponding to an interference fit between mount 310 and runner 330 where mount 310 expands into runner 330. According to some embodiments, the magnitude of the difference between the first inner radial distance and the third inner radial distance can be greater than the magnitude of the difference between the first outer radial distance RD1 and the third outer radial distance RD3.

As rotor 210 spins, friction between (a) spring sleeves 324 and runner 330 and (b) spring sleeves 324 and mount 310 can discourage rotational slipping between runner 330 and mount 310. Springs 320 can apply a third spring frictional torque against runner 330. Mount 310 can apply a third mount frictional torque against runner 330 (by virtue of the contact at inner interface 280).

The third spring frictional torque can be greater than the second spring frictional torque. The third mount frictional torque can be greater than the second mount frictional torque. The third mount frictional torque can be greater than or equal to the third spring frictional torque. The third mount frictional torque can dominate the third spring frictional torque. For example, the third mount frictional torque can be an order of magnitude greater (i.e., at least an order of magnitude greater) than the third mount frictional torque.

The frictional torques can stop (i.e., substantially prevent) rotational slipping between (a) springs 320 and mount 310, (b) springs 320 and runner 330, and (c) mount 310 and runner 330. Less rotational slipping for each of (a), (b), and (c) can occur in the hot state than in the intermediate state.

The hot state can be defined to occur during a steady state of the machine (e.g., gas turbine engine 10). Assembly 60 can be configured to leak fluid into interface 290 during the cold, intermediate, and/or hot states. The leaked fluid can form a film between ring 350 and runner 330 to discourage (i.e., substantially prevent) direct contact between ring 350 and runner 330. According to some embodiments, assembly 60 is configured (e.g., sized) such that contact between mount 310 and runner 330 only occurs once assembly 60 is in the hot state. According to these embodiments, there is only nominal, if any, contact between mount 310 and runner 330 during the cold and intermediate states.

According to some embodiments, retainers 340 are positioned such that only one of retainers 340 is in direct contact with runner 330 during the cold, intermediate, and/or hot states such that runner 330 does not experience longitudinal compression from retainers 340 during the cold, intermediate, and/or hot states. Put differently, a small longitudinal gap can always be present between one longitudinal side of runner 330 and one of the retainers 340.

As stated above, component 220 was only referred to as a stator for convenience. According to various embodiments, components 210 and 220 are in a rotational relationship (i.e., both are rotors), which rotate in the same or opposite directions. Therefore, ring 350 can counter-rotate with respect to runner 330. According to some embodiments, component 220 can be radially inward respect to component 210. All other features in the Figures can remain the same, except rotational axis A1 can intersect component 220 instead of component 210. In at least the cold state, the presence of at least one (and in some cases, both) springs 320 can be necessary to prevent rotational slipping between runner 330 and mount 310.

We claim:

1. A machine comprising:
   a radially inner component, a radially outer component, and a circumferential seal assembly between the inner and outer components, at least one of the inner and outer components being a rotor, the circumferential seal assembly comprising:
   a circumferential metallic mount secured to the inner component;
   a circumferential ceramic runner disposed radially outward of the mount;
   a circumferential carbon seal disposed in a housing, the housing being secured to the outer component, the carbon seal and the runner configured to define an outer interface therebetween, the outer interface separating a first fluid disposed in the machine from a second fluid disposed in the machine;
   one or more spring energized seals each comprising a spring disposed within a sleeve, the one or more spring energized seals simultaneously contacting the runner and the mount,
   wherein the mount and the one or more spring energized seals are sized such that the one or more spring energized seals supports the runner radially outward of the mount to form a radial gap between the runner and the mount in response to the machine operating in a first condition and the mount thermally expands into direct physical contact with the runner to fill the gap in response to the machine operating in a second condition different than the first condition,
   wherein the first condition is a startup condition and the second condition is a steady state condition;
   in the startup condition, the runner rotationally slipping with respect to the mount;
   in the steady state condition, the mount forms an interference fit with the runner and rotationally retains the runner.

2. The machine of claim 1, wherein the machine is a gas turbine engine mounted to an aircraft.

3. A machine comprising:
   a radially inner component, a radially outer component, and a circumferential seal assembly between the inner and outer components, at least one of the inner and outer components being a rotor, the circumferential seal assembly comprising:
   a circumferential metallic mount secured to the inner component;
   a circumferential ceramic runner disposed radially outward of the mount;
   a circumferential carbon seal disposed in a housing, the housing being secured to the outer component, the carbon seal and the runner configured to define an outer interface therebetween, the outer interface separating a first fluid disposed in the machine from a second fluid disposed in the machine;
   one or more spring energized seals each comprising a spring disposed within a sleeve, the one or more spring energized seals simultaneously contacting the runner and the mount,
   wherein the mount and the one or more spring energized seals are sized such that the one or more spring energized seals supports the runner radially outward of the mount to form a radial gap between the runner and the mount in response to the machine operating in a first condition and the mount thermally expands into direct physical contact with the runner to fill the gap in response to the machine operating in a second condition different than the first condition,
   wherein the one or more spring energized seals and an outermost surface of the mount are simultaneously in direct physical contact with the runner in response to the machine operating in the second condition.

4. The machine of claim 3, configured such that the one or more spring energized seals and the outermost surface of the mount are simultaneously in direct physical contact with a single inner circumferential surface of the runner.

5. The machine of claim 1, wherein the circumferential seal assembly comprises a pair of longitudinal retainers, each configured to contact the runner and the mount.

6. The machine of claim 1, wherein in the first condition, frictional torque applied by the one or more spring energized seals against the runner exceeds any frictional torque applied by the mount against the runner.

7. The machine of claim 6, configured such that in the second condition, frictional torque applied by the mount against the runner exceeds frictional torque applied by the one or more spring energized seals against the runner.

8. The machine of claim 1, wherein the mount is press-fit onto the radially inner component.

* * * * *